Oct. 31, 1950          C. PYLE ET AL          2,527,654
FORMALDEHYDE CONCENTRATION
Filed Feb. 24, 1947                      2 Sheets-Sheet 1

Cyrus Pyle
James A. Lane    INVENTORS

BY
ATTORNEY

Patented Oct. 31, 1950

2,527,654

UNITED STATES PATENT OFFICE 2,527,654

FORMALDEHYDE CONCENTRATION

Cyrus Pyle, New Castle, and James A. Lane, Wilmington, Del., assignors to E. I. du Pont de Nemours & Company, Wilmington, Del., a corporation of Delaware Application February 24, 1947, Serial No. 730,634

12 Claims. (Cl. 202—40)

1

This invention relates to the concentration of aqueous solutions of formaldehyde, and more particularly it relates to the production of highly concentrated formaldehyde compositions by fractionation from relatively dilute aqueous solutions thereof.

Aqueous solutions of formaldehyde have been concentrated for many years by vacuum distillation in the commercial production of paraformaldehyde. By distillation under vacuum a dilute formaldehyde solution is distilled and paraformaldehyde is left behind as a still residue. Aqueous solutions of formaldehyde have also been concentrated by distillation at above atmospheric pressure. By distillation at above atmospheric pressure, a fairly concentrated vapor is distilled off and a dilute solution remains behind as residue.

Neither vacuum distillation nor pressure distillation of aqueous formaldehyde have proven to be completely satisfactory for the concentration of such solutions. When vacuum distillation is employed, the temperature of the solution in the distillation column is below that necessary to keep the formaldehyde composition in the liquid state at or near the bottom of the column. As a result, precipitation of polymerized formaldehyde takes place, and if 90% to 97% formaldehyde (paraformaldehyde) is produced in the bottom of the column it will freeze completely to the solid state. When pressure distillation is employed, high concentrations cannot be obtained; 60% to 65% concentration being about the maximum obtainable. Formaldehyde solutions can also be concentrated to a limited extent by fractionation at atmospheric pressure. At atmospheric pressure the overhead vapors from a distillation column will contain about 21% formaldehyde.

It is an object of this invention to provide an improved method of fractionating aqueous solutions of formaldehyde.

It is another object of this invention to concentrate aqueous solutions of formaldehyde by fractionation to obtain dilute solutions of formaldehyde as distillate and liquid formaldehyde compositions of 70% to 97% concentration as residue.

It is still another object of this invention to fractionate aqueous solutions of formaldehyde to obtain substantially formaldehyde-free water and a liquid formaldehyde composition containing between 70% and 97% formaldehyde.

Other objects of the invention will appear hereinafter.

2

The objects of this invention may be accomplished by fractionating an aqueous solution of formaldehyde with a sizable pressure drop from plate to plate from the bottom to the top of the fractionating column.

The invention will be more readily understood by reference to the accompanying illustrations, in which.

Figure 1:
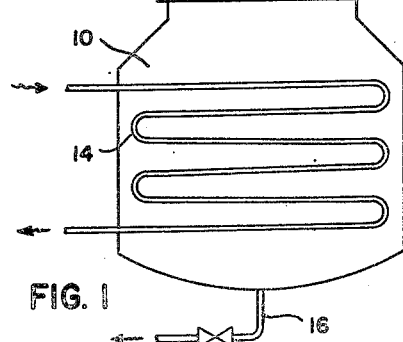
Fig. 1 is a diagrammatic view showing two fractionating columns connected to operate continuously in accordance with the principles of this invention.

Referring to Fig. 1 of the drawings, reference numeral 10 designates a still kettle which is connected to a fractionating column 12. The kettle 10 is heated by means of steam coil 14. The fractionating column 12 is a plate-type fractionating column and is preferably a bubble-cap type of plate column. The column 12 is constructed in such manner that there will be a considerable pressure drop from plate to plate taken from the bottom of the column to the top. This progressive pressure-drop through the fractionation zone from the bottom to the top may be accomplished in any desired manner, for example, the chimney openings or vapor outlet openings of the bubble caps through which the vapors pass can be made sufficiently small in size or number to restrict the flow of vapors so as to build up the desired pressure. The preferred manner of providing the above-said pressure drop, however, is to maintain an extra-ordinarily large head of liquid on each plate. Such a large head of liquid provides not only a relatively high pressure drop across each plate, but increases the distillation efficiency by reason of a longer travel of the vapor through the liquid.

The fractionation column 12, in order to obtain the desired total pressure differential between top and bottom is preferably constructed with between 20 and 60 plates 18, it being obvious, of course, that the greater the number of plates, the greater will be the degree of fractionation of the substituents.

The aqueous formaldehyde is fed to the fractionating column at point 20, at or near the center of the column. The distilled vapors are passed from the column through conduit 22 and condensed in the water-cooled condenser 24. Cooling water inlet and outlet lines 26 and 28 are regulated to maintain the condenser at the desired temperature. From the condenser 24 the condensate is passed through chamber 30 from which a part is passed through line 34 into the fractionating column as reflux, and a part is either discarded or passed to a second fractionating column 38. A vacuum pump 32 is connected to the top of chamber 30 to maintain any desired sub-atmospheric pressure at the top of column 12.

As a result of the pressure differential through the fractionating column 12, a concentrated liquid formaldehyde composition, chiefly formaldehyde polymer, may be withdrawn through line 16 from the bottom of the still pot 10, and a dilute aqueous solution of formaldehyde is withdrawn from chamber 30 through line 36.

If the dilute formaldehyde withdrawn through line 36 contains too much formaldehyde to be discarded as water, it may be recovered in a second fractionating column 38. This second column is provided with a plurality of plates 40, preferably bubble-cap plates, and the dilute solution of formaldehyde is fed in at point 37 near the center of the column. Steam at an elevated temperature and pressure is blown directly into the bottom of the still through line 42. The column 38 is thus operated under sufficient pressure to remove nearly all of the formaldehyde as vapor, together with water vapor from the top of the column through line 46. The formaldehyde and water vapors removed through line 46 are condensed in condenser 48 which is provided with cooling water inlet and outlet lines 50 and 52, respectively. Since the column 38 is operated at a pressure above atmospheric, it may be necessary to provide feed line 36 with a pump 55 to force the formaldehyde solution into column 38.

The condensed, concentrated formaldehyde solution may be split into two parts, one part being passed through line 54 back into the top of column 38 as reflux, and the other part being passed through line 56 into feed line 20 connected to the first column. Column 38 may obviously be operated at such temperature and pressure as to furnish a product having substantially the same concentration of formaldehyde as the solution being fed to column 12. A substantially formaldehyde-free water ($CH_2O$ content 0.01% to 0.5%) is withdrawn as water through line 44 at the bottom of column 38.

Figure 2:
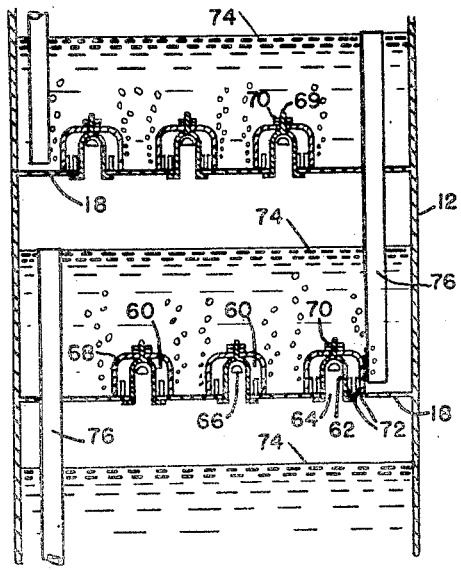
Fig. 2 is an enlarged cross-sectional view of a portion of a bubble-cap plate column constructed to operate in accordance with the present invention.

Fig. 2 of the drawings shows a preferred bubble-cap type of plate column which is particularly suitable for use in column 12 of Fig. 1. Plates 18 of the column 12 are shown with a plurality of bubble-caps 60. Each bubble cap is comprised of a chimney 62 and a cap 68. The chimney 62 has an open mouth 64, a series of vapor openings 66, and a stem 69. The cap 68 has a series of spaced slots 72. The chimney 62 and cap 68 are fixed to the plate 18 by passing the threaded stem through a hole in the top of cap 68 and screwing a pair of lock nuts 70 on the stem. A flange on the bottom of the chimney holds the same to the plate 18. Each plate is provided in the regular manner with at least one overflow pipe 76, whereby to pass the liquid downwardly from one plate to another. In order to maintain the high liquid level 74 on each plate 18, the height of the overflow pipe above the plate is made considerably longer than usual. As explained above, this high level of liquid on each plate is the prefered construction to provide a considerable pressure differential between plates.

Figure 3:
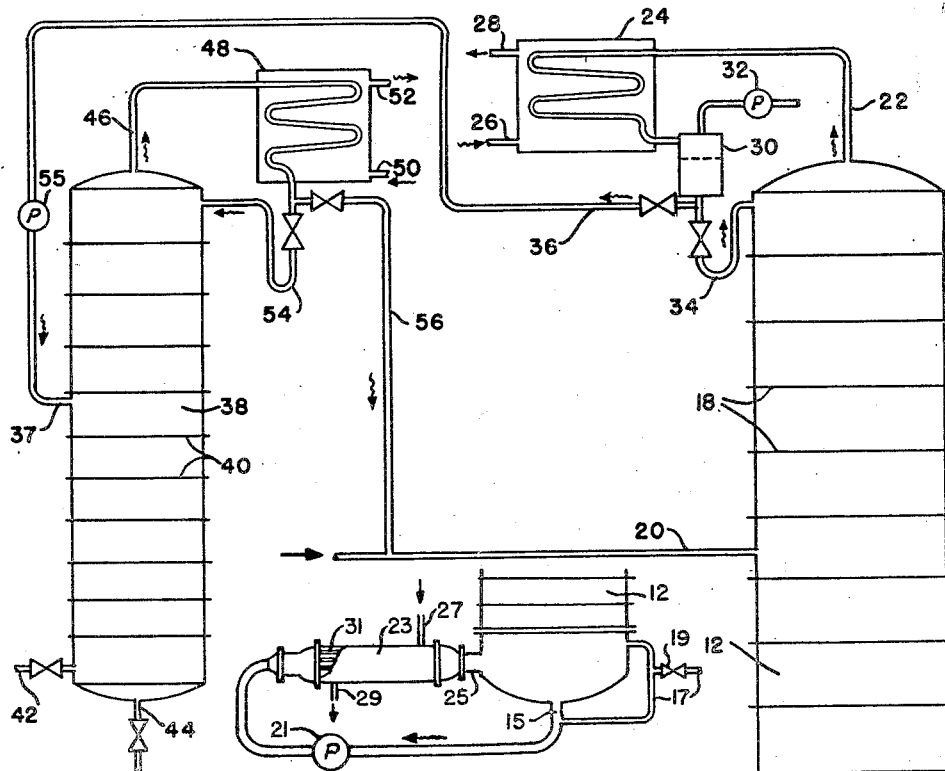
Fig. 3 is a diagrammatic view showing a modified form of heater which may be desired for boiling of highly concentrated product (paraformaldehyde) at the bottom of a concentration column.

Fig. 3 shows a slightly modified form of fractionating column which is particularly useful when the concentrated product at the bottom of column 12 is viscous. In this modification, a steam calandria 23 is provided for heating of the concentrated bottom product. The bottom product (highly concentrated formaldehyde or paraformaldehyde) is forced through line 15, tubes 31, and line 25 by means of circulating pump 21. A portion of the product may be withdrawn from line 15 through line 17 regulated by valve 19. The calandria is heated by steam passing therethrough by lines 27 and 29.

Figure 4:
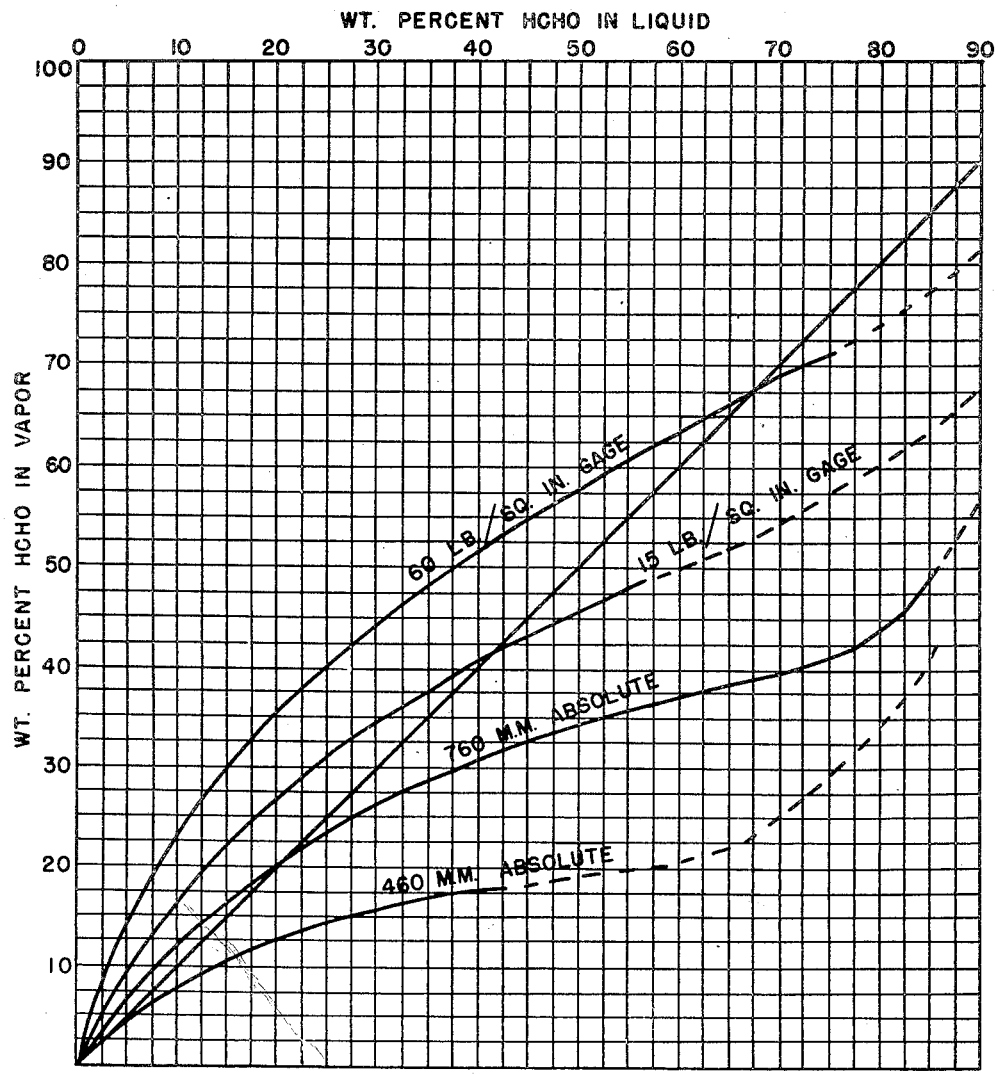
Fig. 4 is a graphic diagram showing constant pressure equilibria curves for formaldehyde-water mixtures at four different pressures.

Fig. 4 of the drawings shows the graphic curves representing the vapor-liquid equilibria of different formaldehyde-water mixtures at four given pressures. The curves are plotted to show how the weight per cent of formaldehyde in the vapor varies with variations in the weight per cent of formaldehyde in the liquid. The formaldehyde solutions possess minimum boiling points where the curves intersect the 45° slope line. A formaldehyde solution having the concentration designated by this point of intersection will have a constant boiling point at the pressure given for that curve, and no further separation will take place.

It will be noted, however, that the composition of the azeotropes, i. e., constant boiling mixtures (points where the curves cross the 45° slope line) increase in formaldehyde content with increasing pressure.

In any formaldehyde concentration the azeotrope will be the lowest boiling composition and will consequently be driven off as the vapor product from the top of the column. It is evident from the experimental curves submitted that the composition of the overhead distillate product will depend upon the pressure at which the distillation is conducted.

Thus, if an overhead distillate product of 67.5% formaldehyde content is desired, the distillation should be conducted at 60 lbs. per square inch gage pressure. Such a product could not be secured by operation at 15 lbs. per square inch gage pressure because the lowest boiling composition here, as determined from the curve, is of approximately 41% formaldehyde content.

The compositions of the top distillate product and the bottom residual product depend upon the formaldehyde concentration in the material fed at any particular distillation pressure. Thus, if material below 41% formaldehyde concentration is introduced at 15 lbs. per square inch gage operating pressure, the top distillate product will have substantially the azeotrope composition of 41% while the bottom product will be water. However, if the material introduced has a formaldehyde content greater than 41%, the top distillate product will still have the azeotrope composition of 41% while the bottom product will be concentrated formaldehyde, predominantly formaldehyde polymer, of the composition indicated by the dotted line extension of the curve, that is, up to about 97% concentration as the practical maximum. As a practical matter where a highly concentrated bottom product is required, it is desirable to take the most dilute product possible out of the top as overhead distillate in which case operation at 760 mm. of Hg absolute pressure or below is preferred.

As will be later explained, the distillation of this process is conducted over a pressure range in a column where a high over-all pressure differential is maintained. Under these conditions the operation distillation curves will deviate from the curves given in Fig. 4, because the latter are a plot of constant pressure data, but the principles outlined above remain unchanged.

The term "azeotrope" as above referred to with reference to mixtures of formaldehyde and water may be considered as somewhat inapt since the vapor in equilibrium with the liquid differs in chemical composition from the latter. The vapor consists of monomeric formaldehyde and water vapor, whereas the liquid phase is composed of water, methylene glycol, and polymeric formaldehyde hydrates. Since, however, a given solution continues to give off the formaldehyde-water vapor, an apparent formaldehyde-water azeotropic mixture is considered to be present at any given pressure of distillation. As above shown, an efficient column operating at atmospheric pressure will deliver an apparent azeotrope containing 20–21% formaldehyde; a column operating at 15 lbs. gage pressure will deliver an apparent azeotrope containing about 40% formaldehyde; and a still operating at 60 lbs. gage pressure will deliver an apparent azeotrope containing about 68% formaldehyde. At pressures in the neighborhood of 500 mm. Hg or below, the apparent azeotrope concentration falls off rapidly to about 5% to 0% formaldehyde.

This peculiar behavior of aqueous solutions of formaldehyde is utilized in accordance with the present invention to separate formaldehyde solutions into highly concentrated solutions, 75% to 97% solutions, and very dilute solutions, 1% to 10% solutions. Although the formaldehyde solutions used as feed in the distillation process of the present invention will preferably contain 25% to 50% by weight of formaldehyde, weaker or stronger solutions can be readily utilized. Solutions containing as little as 5% formaldehyde or solution of any strength above 50% can likewise be used. Formaldehyde is most generally produced by the oxidation of methanol and is usually isolated as a 30% to 45% aqueous solution. Such aqueous solutions of formaldehyde lend themselves most admirably to concentration by the process of this invention.

As shown in Fig. 1, column 12 is provided at its lower end with a still pot containing a steam coil 14, or boiler, by which the liquid in the bottom of the pot is heated. The temperatures maintained in column 12 will depend upon the pressures which it is desirable to maintain and the overhead and bottom products desired. The concentrating effect of this process may be realized under wide ranges of operating pressures and temperatures for the reason that it is dependent upon a high pressure differential across the plates of the column rather than on absolute pressures existing at any particular point in the column.

The following example is given to furnish the specific pressure, temperature and composition values existing under one set of production conditions, namely, where a bottom product of 90% to 95% formaldehyde concentration is desired with a top distillate product of 5% to 10% formaldehyde concentration, the balance in both cases being water.

Under these conditions, the pressure at the bottom of the column will be maintained at atmospheric level while the liquid will be maintained at a temperature of 120° C. by heating in the still pot 10. The absolute pressure at the top of the column will be maintained at about 500 mm. of Hg, by the action of vacuum pump 32 while the temperature at the top of the column will be about 85° C. In order to maintain this pressure differential, a column of about 32 plates is used with the liquid maintained at a level of about 3 inches above the top of slots 72 in the bubble caps.

Concentrated product is removed from the system through jacketed valved line 16. Vaporous distillate leaves the column through line 22 leading to water-cooled shell and tube condenser 24 where it is condensed. This condensate contains from 5% to 10% formaldehyde by weight and a portion is returned to the column through line 34, which is fitted with a liquid seal, while the remainder is removed through line 36 and pump 55 to recovery column 38.

Recovery column 38 may be a bubble cap-plate type column having fifteen to forty plates and operating under a pressure of 35 to 70 lbs. per square inch gage, preferably about 60 lbs. Since this column operates at a higher pressure than column 12, the equilibrium conditions are different than the equilibrium conditions in column 12 and a high pressure differential over the column is not required to effect separation at the concentrations here desired.

Live steam at a temperature of about 153° C. and a pressure of about 60 lbs. per square inch is supplied to column 38 through line 42, the steam being fed to the inside of the column directly, the bottom product in this case being substantially formaldehyde-free (0.1–0.01%) water which is withdrawn as required through valved line 44. The overhead product of column 38 is a 50% by weight solution of formaldehyde in water which is withdrawn as a vapor through line 46, condensed in liquid-cooled shell and tube condenser 48 at a temperature of about 113° C., and either returned as reflux through line 54 or withdrawn as product through line 56. The product from line 56 may be supplied to line 20 for reconcentration if desired.

In order to obtain a good efficiency of separation, it is preferred that column 12 be operated with the formaldehyde solution being fed thereto at a concentration of at least 25% and with a residuum concentration at the bottom of 70% to 97%, and a distillate concentration at the top of less than 1% to 10%. The bottom of the column preferably is maintained at a pressure at least 200 mm. Hg above that of the top of the column. The column should have at least 20 plates and the total pressure drop uniformly divided from plate to plate. If the pressure differential is obtained by maintaining a high liquid level on the plates, a level of liquid at least 2½ inches above the vapor emitting opening on the plates should be employed. It is furthermore preferred that the bottom of the column be maintained at a pressure within about ½ atmosphere of atmospheric pressure so that the temperature of the effluent liquid will be in the range 70–120° C.

Although it is preferred to operate the distillation process of this invention with a recovery column such as column 38 of Fig. 1, however, such a recovery column is not essential. If a single column is operated with high efficiency, the portion of the distillate which is not returned as reflux can be discarded as waste. If a single column is employed and the distillate discarded as waste, it is preferred to operate the same with a pressure differential between top and bottom of at least 400 mm. Hg.

Reference in the specification and claims to parts, proportions, and percentages, unless otherwise specified, refers to parts, proportions, and percentages by weight.

Since it is obvious that many changes and modifications can be mde in the above-described details without departing from the nature and spirit of the invention, it is to be understood that the invention is not to be limited to said details except as set forth in the appended claims.

What is claimed is:

1. The process of concentrating formaldehyde which comprises fractionating an aqueous solution of formaldehyde by passing the same into a fractionating column while maintaining a pressure differential of at least 200 mm. Hg through the fractionating column, the concentration of the formaldehyde in the solution passed into said fractionating column being higher than the concentration of formaldehyde in the vapors passing from said column and maintaining such a pressure in the column that the concentration of the formaldehyde in the vapors is less than the concentration of the formaldehyde in the solution at any section of the column.

2. The process of concentrating formaldehyde which comprises fractionating an aqueous solution of formaldehyde by passing the same into a fractionating column while maintaining a uniform pressure differential from plate to plate, the total pressure differential through the column totaling at least 200 mm. Hg, the concentration of the formaldehyde in the solution passed into said fractionating column being higher than the concentration of formaldehyde in the vapors passing from said column and maintaining such a pressure in the column that the concentration of the formaldehyde in the vapors is less than the concentration of the formaldehyde in the solution at any section of the column.

3. The process of concentrating formaldehyde which comprises fractionating an aqueous solution of formaldehyde by passing the same into a fractionating column while maintaining a pressure differential of at least 200 mm. Hg through the fractionating column, the concentration of the formaldehyde in the solution passed into said fractionating column being higher than the concentration of formaldehyde in the vapors passing from said column, and maintaining a pressure within ½ atmosphere of atmospheric pressure at the bottom of the column.

4. The process of concentrating formaldehyde which comprises fractionating an aqueous solution of formaldehyde by passing the same into a fractionating column while maintaining a uniform pressure differential from plate to plate, the total pressure differential through the column totaling at least 200 mm. Hg, the concentration of the formaldehyde in the solution passed into said fractionating column being higher than the concentration of formaldehyde in the vapors passing from said column, and maintaining a pressure within ½ atmosphere of atmospheric pressure at the bottom of the column.

5. The process of concentrating formaldehyde which comprises fractionating an aqueous solution of formaldehyde by passing the same into a fractionating plate-column while maintaining a pressure differential of at least 200 mm. Hg through the fractionating column, the concentration of the formaldehyde in the solution passed into said fractionating column being higher than the concentration of formaldehyde in the vapors passing from said column and maintaining such a pressure in the column that the concentration of the formaldehyde in the vapors is less than the concentration of the formaldehyde in the solution at any section of the column, said pressure differential being obtained by maintaining the liquid at least 2½ inches above the vapor emitting openings in the plates of the column.

6. The process of concentrating formaldehyde which comprises fractionating an aqueous solution of formaldehyde by passing the same into a fractionating column while maintaining a pressure differential of at least 200 mm. Hg through the fractionating column, the concentration of the formaldehyde in the solution passed into said fractionating column being higher than the concentration of formaldehyde in the vapors passing from said column, and maintaining a pressure within ½ atmosphere of atmospheric pressure at the bottom of the column, said pressure differential being obtained by maintaining the liquid at least 2½ inches above the vapor emitting openings in the plates of the column.

7. The process of concentrating formaldehyde which comprises fractionating an aqueous solution of formaldehyde by passing the same into a fractionating column while maintaining a uniform pressure differential from plate to plate, the total pressure differential through the column totaling at least 200 mm. Hg, the concentration of the formaldehyde in the solution passed into said fractionating column being higher than the concentration of formaldehyde in the vapors passing from said column, and maintaining a pressure within ½ atmosphere of atmospheric pressure at the bottom of the column, said pressure differential being obtained by maintaining the liquid at least 2½ inches above the vapor emitting openings in the plates of the column.

8. The process of concentrating formaldehyde which comprises fractionating an aqueous solution of formaldehyde by passing the same into a fractionating plate-column while maintaining a pressure differential of at least 200 mm. Hg through the fractionating column, the concentration of the formaldehyde in the solution passed into said fractionating column being higher than the concentration of formaldehyde in the vapors passing from said column, said fractionation being operated with partial reflux to maintain the concentration of the aqueous formaldehyde condensate between 1% and 10% formaldehyde, and with a withdrawal of liquid at the bottom of the column at such a rate as to maintain the concentration thereof between 70% and 97% formaldehyde.

9. The process as defined in claim 8 in which the bottom of the column is maintained at a pressure within ½ atmosphere of atmospheric pressure.

10. The process as defined in claim 8 in which the pressure differential through the column is maintained by maintaining the liquid at least 2½ inches above the vapor emitting openings in the plates of the column.

11. The process of concentrating formaldehyde which comprises fractionating an aqueous solution of formaldehyde by passing the same into a fractionating column while maintaining a uniform pressure differential from plate to plate, the total pressure differential through the column totaling at least 200 mm. Hg, the concentration of the formaldehyde in the solution passed into said fractionating column being higher than the concentration of formaldehyde in the vapors passing from said column, maintaining a pressure within ½ atmosphere of atmospheric pressure at the bottom of the column, collecting the distillate from the top of said column, fractionating the distillate at pressure of 35 to 70 lbs. per square inch gage and collecting the distillate from said second fractionation.

12. The process of concentrating formaldehyde which comprises fractionating an aqueous solution of formaldehyde by passing the same into a fractionating column while maintaining a uniform pressure differential from plate to plate, the total pressure differential through the column totaling at least 200 mm. Hg, the concentration of the formaldehyde in the solution passed into said fractionating column being higher than the concentration of formaldehyde in the vapors passing from said column, maintaining a pressure within ½ atmosphere of atmospheric pressure at the bottom of the column, collecting the distillate from the top of said column, fractionating the distillate at pressure of 35 to 70 lbs. per square inch gage and collecting the distillate from said second fractionation and returning the same to said first fractionating step.

CYRUS PYLE.
JAMES A. LANE.

REFERENCES CITED

The following references are of record in the file of this patent:

UNITED STATES PATENTS

| Number | Name | Date |
|---|---|---|
| 2,257,780 | Bludworth | Oct. 7, 1941 |

OTHER REFERENCES

Perry, "Chemical Engineer's Handbook," 2nd ed., 1941, McGraw-Hill, pages 1448 to 1457.